US008210781B2

(12) United States Patent
Chang et al.

(10) Patent No.: US 8,210,781 B2
(45) Date of Patent: Jul. 3, 2012

(54) PROCESSING MACHINE

(75) Inventors: Paul Chang, Taichung County (TW); Tsair-Rong Chen, Changhua County (TW); Jeen-Sheen Row, Miaoli County (TW); Yuan-Fu Tsai, Taichung County (TW)

(73) Assignees: Buffalo Machinery Company Limited, Daya Township (TW); The Department of Electrical Engineering, National Chang-Hua University of Education, Changhua (TW)

( * ) Notice: Subject to any disclaimer, the term of this patent is extended or adjusted under 35 U.S.C. 154(b) by 903 days.

(21) Appl. No.: 12/269,751

(22) Filed: Nov. 12, 2008

(65) Prior Publication Data

US 2010/0119319 A1 May 13, 2010

(51) Int. Cl.
*B23C 1/02* (2006.01)

(52) U.S. Cl. ......... 409/185; 408/234; 409/235; 409/237

(58) Field of Classification Search .......... 409/183–185, 409/231, 233, 235, 190–191, 237; 408/234, 408/235

See application file for complete search history.

(56) References Cited

U.S. PATENT DOCUMENTS

| | | | | |
|---|---|---|---|---|
| 3,097,568 | A * | 7/1963 | Kampmeier | 409/239 |
| 4,444,534 | A * | 4/1984 | Bergman | 409/164 |
| 4,510,668 | A * | 4/1985 | Ishida et al. | 29/561 |
| 5,294,220 | A * | 3/1994 | Ohmstede et al. | 409/137 |
| 6,203,256 | B1 * | 3/2001 | Liao | 409/235 |
| 7,093,334 | B2 * | 8/2006 | Sobrito | 29/26 A |
| 2003/0190206 | A1 * | 10/2003 | Sugata et al. | 409/235 |
| 2004/0082281 | A1 * | 4/2004 | Kawahara et al. | 451/119 |
| 2004/0086208 | A1 * | 5/2004 | Kawahara et al. | 384/12 |

* cited by examiner

*Primary Examiner* — Daniel Howell

(74) *Attorney, Agent, or Firm* — McDermott Will & Emery LLP

(57) ABSTRACT

A processing machine includes a machine bed, a spindle seat, a sliding rail unit, and a driving unit. The sliding rail unit is disposed between the machine bed and the spindle seat. The driving unit is used for driving the spindle seat to move within a slot in the machine bed, and includes a threaded rod journalled on a junction between a bottom wall surface and a lateral wall surface of the machine bed, and a nut member disposed fixedly on a junction between a bottom surface and a lateral side surface of the spindle seat and engaging the threaded rod.

3 Claims, 2 Drawing Sheets

20 23 L $L_V$ 24 22 30 21 10 11 32′ 32 112 113 $L_H$ 42 41 50 111 31 40

10
112
$L_H$
32
21
22
20
24
$L_V$
L
23
32'
30
113
11
42
41
40
31
111
50

PROCESSING MACHINE

BACKGROUND OF THE INVENTION

1. Field of the Invention

This invention relates to a processing machine, and more particularly to an assembly of a spindle seat and a driving unit of a processing machine.

2. Description of the Related Art

Referring to FIG. 1, a conventional processing machine includes a machine bed 1, a spindle seat 2 disposed within the machine bed 1 for mounting a spindle 5, a sliding rail unit 3 disposed between the machine bed 1 and the spindle seat 2, and a driving unit 4. The sliding rail unit 3 includes two bottom rails 301 disposed between a bottom end of the spindle seat 2 and the machine bed 1, and two side rails 302 each disposed between a corresponding lateral side of the spindle seat 2 and the machine bed 1. The driving unit 4 is disposed on a top end of the spindle seat 2 and above the spindle 5.

The aforesaid conventional processing machine surfers from the following disadvantages:

(1) Since the bottom and side rails 301, 302 are far away from the rotating axis of the spindle 5, when the spindle 5 rotates, torques caused due to vibration of the spindle 5 and applied to the bottom and side rails 301, 302 are relatively large, thereby affecting adversely the steadiness of the spindle seat 2 and the processing accuracy of the machine.

(2) Location of the driving unit 4 above the spindle seat 3 results in an increase in the total volume of the machine.

SUMMARY OF THE INVENTION

An object of this invention is to provide a processing machine that includes a driving unit, which is positioned so as to reduce the total volume of the machine.

Another object of this invention is to provide a processing machine that can improve the processing accuracy.

According to this invention, a processing machine includes a machine bed, a spindle seat, a sliding rail unit, and a driving unit. The spindle seat has a spindle-receiving hole extending along an axis, and defines a horizontal line and a vertical line that cross the axis. The sliding rail unit is disposed between the machine bed and the spindle seat. The driving unit is used for driving the spindle seat to move within a slot in the machine bed, and includes a threaded rod journalled on a junction between a bottom wall surface and a first lateral wall surface of the machine bed, and a nut member disposed fixedly on a junction between a bottom surface and a first lateral side surface of the spindle seat and engaging the threaded rod. Since the threaded rod and the nut member are disposed between the spindle seat and the machine bed, the total volume of the machine is small.

In one embodiment, the sliding rail unit includes:

a bottom rail disposed between the bottom wall surface of the machine bed and the bottom surface of the spindle seat, the vertical line extending through the bottom rail;

a first side rail disposed between the first lateral wall surface of the machine bed and the first lateral side surface of the spindle seat, the horizontal line extending through the first side rail; and a second side rail disposed between a second lateral wall surface of the machine bed and a second lateral side surface of the spindle seat, the horizontal line extending through the second side rail.

As such, the bottom and side rails are close to the axis. Thus, when a spindle mounted on the spindle seat rotates, torques caused due to vibration of the spindle and applied to the bottom and side rails are small, thereby enhancing the processing accuracy of the machine.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
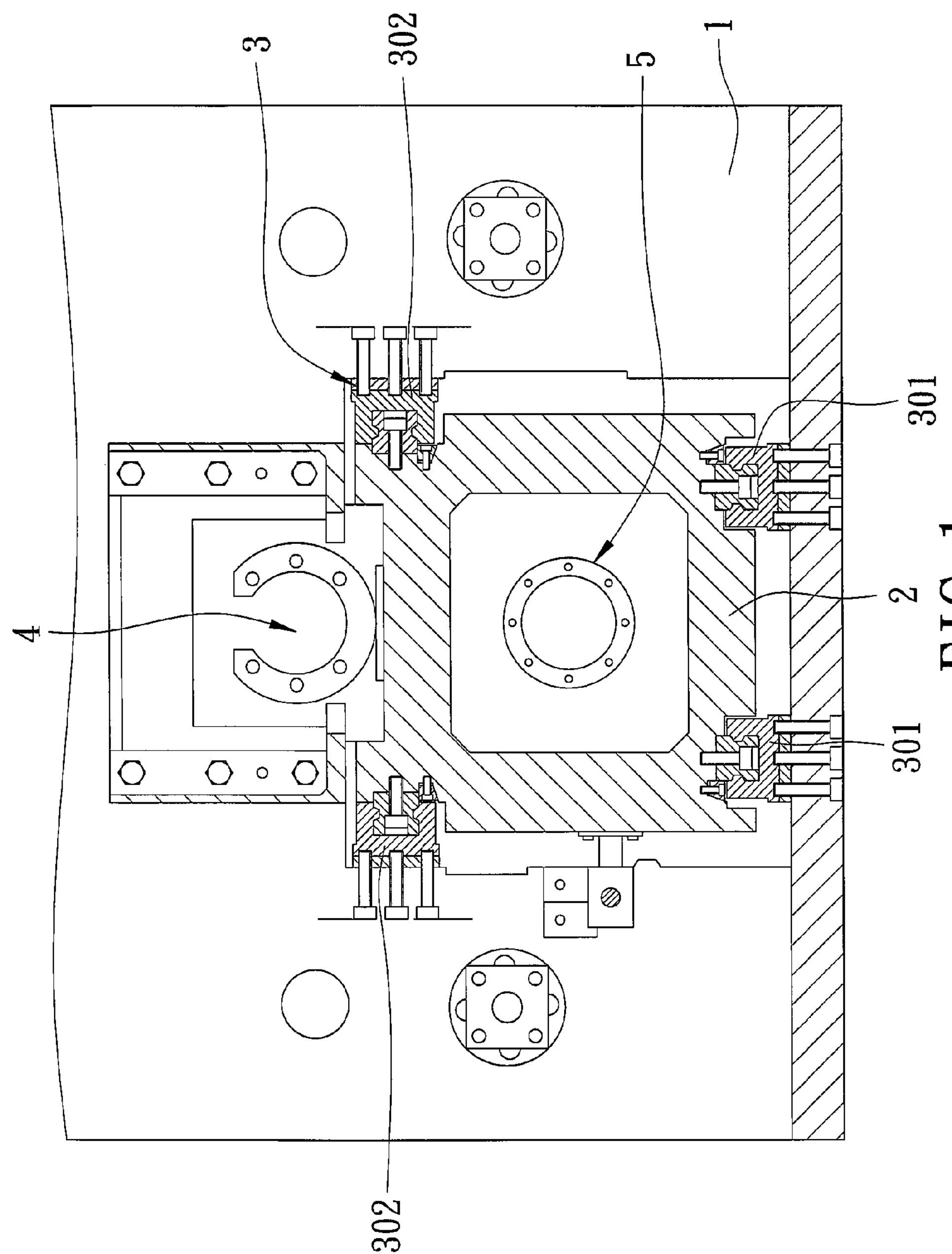
FIG. 1 is a sectional view of a conventional processing machine.
Figure 2:
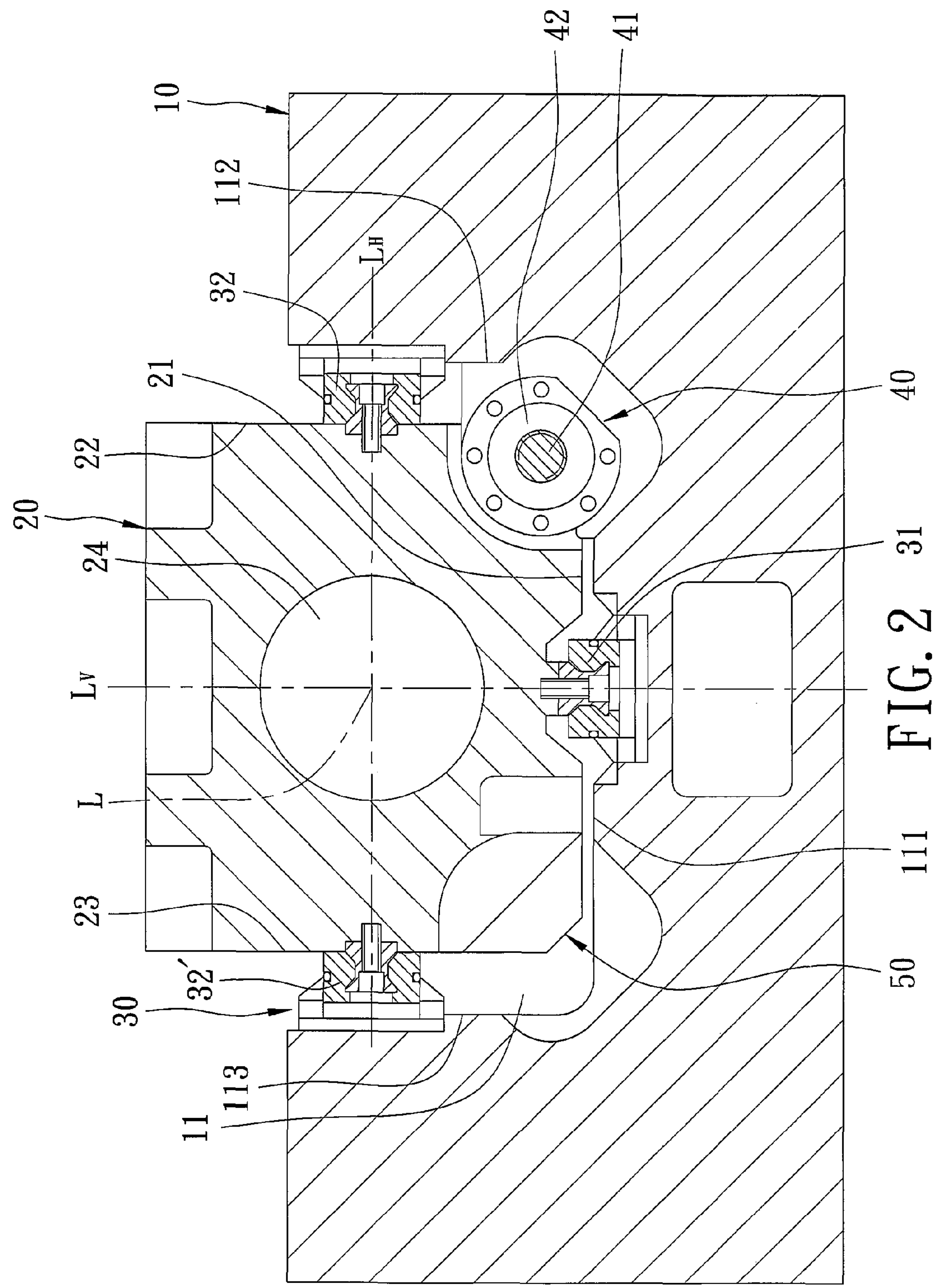
FIG. 2 is a sectional view of the preferred embodiment of a processing machine according to this invention.

Referring to FIG. 2, the preferred embodiment of a processing machine according to this invention includes a machine bed 10, a spindle seat 20 disposed within the machine bed 10, a sliding rail unit 30 disposed between the machine bed 10 and the spindle seat 20, a driving unit 40, and a counterweight unit 50.

The machine bed 10 has a slot 11 defined by a bottom wall surface 111, and first and second lateral wall surfaces 112, 113 extending respectively and upwardly from two opposite sides of the bottom wall surface 111.

The spindle seat 20 is disposed within the slot 11 in the machine bed 10, and has a bottom surface 21 confronting the bottom wall surface 111 of the machine bed 10, first and second lateral side surfaces 22, 23 confronting respectively the first and second lateral wall surfaces 112, 113, and a spindle-receiving hole 24 extending along an axis (L). The spindle seat 20 defines a horizontal line ($L_H$) and a vertical line ($L_V$) that cross the axis (L), and is adapted for mounting a spindle (not shown).

The sliding rail unit 30 includes a bottom rail 31, and first and second side rails 32, 32'. The bottom rail 31 is disposed between the bottom wall surface 111 of the machine bed 10 and the bottom surface 21 of the spindle seat 20. The vertical line ($L_V$) extends through the bottom rail 31. The first side rail 32 is disposed between the first lateral wall surface 112 of the machine bed 10 and the first lateral side surface 22 of the spindle seat 20. The second side rail 32' is disposed between the second lateral wall surface 113 of the machine bed 10 and the second lateral side surface 23 of the spindle seat 20. The horizontal line ($L_H$) extends through the first and second side rails 32, 32'.

The driving unit 40 is used for driving the spindle seat 20 to move within the slot 11 in the machine bed 10, and includes a threaded rod 41 and a nut member 42. The threaded rod 41 is journalled on a junction between the bottom wall surface 111 and the first lateral wall surface 112 of the machine bed 10. The nut member 42 is disposed fixedly on a junction between the bottom surface 21 and the first lateral side surface 22 of the spindle seat 20, and engages the threaded rod 41.

The counterweight unit 50 is aligned with the driving unit 40, and is disposed fixedly on a junction between the bottom surface 21 and the second lateral side surface 23 of the spindle seat 20.

When the threaded rod 41 is driven to rotate, due to engagement between the threaded rod 41 and the nut member 42, the spindle seat 20 moves within the slot 11 in the machine bed 10 along the axis (L).

The processing machine of this invention has the following advantages:

(1) The driving unit 40 is disposed in the groove 11 in the machine bed 10 and between the machine bed 10 and the spindle seat 20. As a consequence, the total volume of the processing machine is smaller than that of the above-mentioned conventional processing machine.

(2) Since the vertical line ($L_V$) extends through the bottom rail 31, and since the horizontal line ($L_H$) extends through the first and second side rails 32, 32', the bottom rail 31 and the first and second side rails 32, 32' are close to the rotating axis of the spindle. Thus, when the spindle rotates, torques caused due to vibration of the spindle and applied to the bottom and side rails 31, 32, 32' are relatively small, thereby improving the steadiness of the spindle seat 2 and the processing accuracy of the machine.

(3) The counterweight unit 50 and the driving unit 40 are symmetrical with respect to the vertical line ($L_V$), when the spindle rotates, the vibration of the spindle can be reduced significantly.

With this invention thus explained, it is apparent that numerous modifications and variations can be made without departing from the scope and spirit of this invention. It is therefore intended that this invention be limited only as indicated by the appended claims.

We claim:

1. A processing machine comprising:

a machine bed having a slot defined by a bottom wall surface, and first and second lateral wall surfaces extending respectively and upwardly from two opposite sides of said bottom wall surface;

a spindle seat disposed within said slot in said machine bed and having a bottom surface confronting said bottom wall surface of said machine bed, first and second lateral side surfaces confronting respectively said first and second lateral wall surfaces, and a spindle-receiving hole extending along an axis;

a sliding rail unit disposed between said machine bed and said spindle seat; and a driving unit for driving said spindle seat to move within said slot in said machine bed, said driving unit including a threaded rod journalled on a junction between said bottom wall surface and said first lateral wall surface of said machine bed, and a nut member disposed fixedly on a junction between said bottom surface and said first lateral side surface of said spindle seat and engaging said threaded rod.

2. The processing machine as claimed in claim 1, wherein said spindle seat defines a horizontal line and a vertical line that cross the axis, and said sliding rail unit includes:

a bottom rail disposed between said bottom wall surface of said machine bed and said bottom surface of said spindle seat, said vertical line extending through said bottom rail;

a first side rail disposed between said first lateral wall surface of said machine bed and said first lateral side surface of said spindle seat, said horizontal line extending through said first side rail; and a second side rail disposed between said second lateral wall surface of said machine bed and said second lateral side surface of said spindle seat, said horizontal line extending through said second side rail.

3. The processing machine as claimed in claim 1, further comprising a counterweight unit aligned with said driving unit and disposed fixedly on a junction between said bottom surface and said second lateral side surface of said spindle seat.

* * * * *